United States Patent [19]
Wakabayashi

[11] 3,722,630
[45] Mar. 27, 1973

[54] EMERGENCY STOPPING DEVICE FOR A WHEELED VEHICLE

[76] Inventor: Manzo Wakabayashi, 7-13, 2-chome, Nishirokugo, Tokyo, Japan

[22] Filed: Mar. 9, 1971

[21] Appl. No.: 122,426

[52] U.S. Cl. .................................................. 188/4 R
[51] Int. Cl. ................................................ B60t 1/04
[58] Field of Search .................... 188/4 B, 4 R, 5, 32

[56] References Cited

UNITED STATES PATENTS

| 1,498,815 | 6/1924 | Sidelinger | 188/4 R |
| 3,605,954 | 9/1971 | Wakabayashi et al. | 188/4 R |

FOREIGN PATENTS OR APPLICATIONS 1,125    6/1913    Great Britain ..................... 188/4 R Primary Examiner—Duane A. Reger
Attorney—Holcombe, Wetherill & Brisebois

[57] ABSTRACT

Emergency stopping device comprises a frame mounted to swing between a position in the path of travel of a rear wheel and a position clear thereof. There is a sliding connection between the frame and its support so that the wheel can ride up on it, and the frame is provided with rollers which permit the wheel to rotate thereon while the vehicle forward motion of the vehicle is braked by friction between the frame and the road.

1 Claim, 3 Drawing Figures

EMERGENCY STOPPING DEVICE FOR A WHEELED VEHICLE

SUMMARY OF THE INVENTION

The present invention relates to an emergency stopping device for wheeled vehicles such as automobiles, airplanes, etc.

While emergency brakes for stopping the wheels of a taxiing plane have not been proposed to applicant's knowledge, applicant has already devised an emergency stopping device for an automobile, which is held on the underside of the car, and in case of emergency, is dropped in the path of the rear wheel due to actuation by the driver from the driver's seat. This device stops the car when the rear wheel climbs onto the device and is blocked by it. The device is suspended from a wire or the like and, in case of emergency, the driver in the seat releases the wire to drop it in the path of the rear wheel. Such a device is, however, often ineffective. For instance, when the car body is vibrating or when the road surface inclines to one side and the car is running in a tilted position when the device is released in an emergency, it may not fall exactly in the path of the rear wheel, or even if it drops in that path, it may lie in such a direction that the rear wheel cannot climb and be blocked by it.

The object of the present invention is to provide an emergency stopping device for a car or the like which will drop exactly in the path of the rear wheel even if the car body is vibrating or the car is running along an inclined road surface.

In general terms, the apparatus according to the invention consists essentially of a shaft extending transversely in front of the rear wheels, two arms mounted to pivot about the shaft and slotted to receive the shaft, and a frame equipped with a plurality of rollers for rotatably supporting the wheels when the wheels climb up thereon, said frame being carried between said arms and normally positioned in front of the rear wheels.

The frame carries a pair of rollers at one end, an antiskid projection on its lower surface and stop means at its other end. A roller is mounted between two short arms attached to the middle of the frame, and is spring biased to swing on the short arms and strike the stop means.

A preferred embodiment of my invention will now be described with reference to the accompanying drawings, in which.

Figure 1:
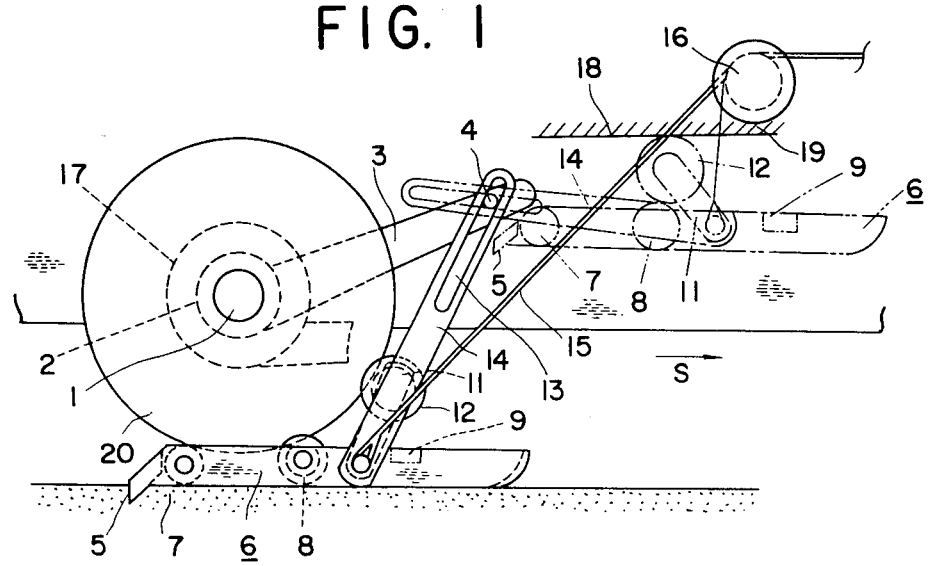
FIG. 1 is a schematic side view showing the two positions occupied by my new device.
Figure 2:
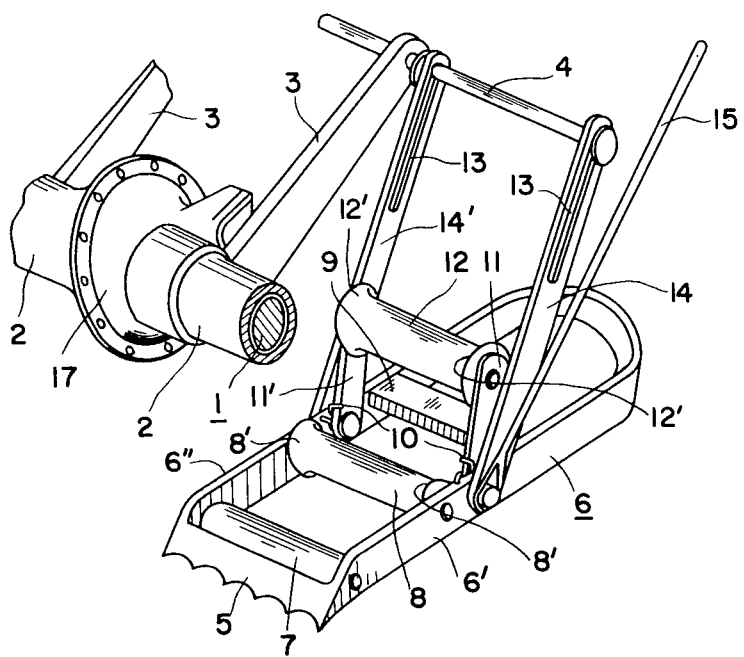
FIG. 2 is a perspective detail view, showing my new device.
Figure 3:
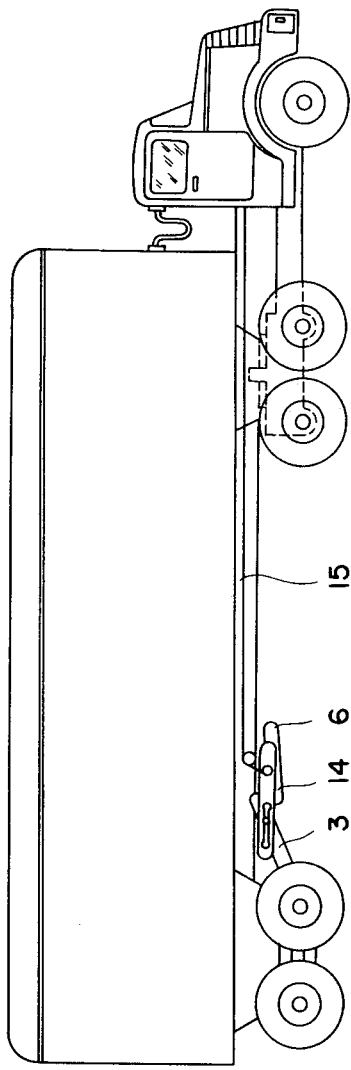
FIG. 3 is a schematic side view showing my device mounted on a truck.

Referring now to FIG. 1, which is adapted for use with a passenger automobile, each device comprises a pair of arms which extend from the support 2 for the rear axle 1. These arms 3 carry at their forward ends the shaft 4 which extends parallel to the axis, in front of the wheel. Two rollers 7, 8 are mounted near one end of the frame 6, which is equipped with an anti-skid projection 5 on its underside. A stop 9 is mounted near the other end of said frame 6. The arms 11, 11' are pivotally attached to the midpoint of the sides 6', 6'' of said frame 6 and are biassed to turn clockwise (as seen in FIG. 2) toward the stop 9 by a spring 10. The free ends of the arms 11, 11' carry rotatably mounted rollers 12. The frame 6 is suspended from the shaft 4 by means of arms 14, 14'. Each arm 14, 14' is provided with a slot 13 at its upper end in which the shaft 4 is rotatably and slidably received. The lower ends of the arms 14, 14' are pivotally attached to the frame 6. One end of a wire 15 is anchored to the side 6' of said frame 6. This wire runs over the pulley 16 on the car body and is wound on a reel (not shown). The driver in the seat can wind or unwind this reel.

In the illustrated embodiment the axle support is the bearing casing of the rear axle 1, because in some recent cars there is no chassis per se and the bearing casing for the rear axle 1 has been found best suited for supporting the shaft 4. But if the end of the laminated spring for supporting the rear wheel axle 1 is available, this may instead be used to support the shaft 4. Of course, when the car is mounted on a chassis, the shaft 4 may project from some part of the chassis. It goes without saying that the rollers 7, 8, 12 can be ball bearings to make the mounting pivotal. Reference numeral 17 indicates a differential gear casing. In the present embodiment, the wire 15 is attached to the outer side 6', but it may be attached to the inner side 6'', or to both sides.

When the wire 15 is wound up, the frame 6 rises to the position indicated by the chain line in FIG. 1, and thereby, on encountering the part 19 of the car body, the roller 12 is tilted against the force of the spring 10. Thus the frame 6 can be held at a relatively high level, and arms 14, 14' can be appropriately folded up.

If the roller 12 is adapted to move with the arms 14, 14', or if an appropriate guide plate is provided beneath the vehicle body, it is possible to automatically incline the roller 12 at a predetermined position as the wire is wound up.

The frame 6 in the device can thus be automatically held in its upper position by operation of the driver in the seat.

In case of emergency, when the driver in the seat electrically or mechanically releases the wire 15, the shaft 4 slides along the long slit 13 in the arms 14, 14' to let the frame 6 drop to the ground. Since the frame 6 is linked to the shaft 4 through the pair of hanging arms 14, 14', it comes down directly in the path of travel of the rear wheels. At the same time, the arms 11, 11' are urged by the spring 10 against the stop 9 and move the roller 12 to the position indicated by the solid lines in FIG. 1. Next, the rear wheels 20 climb onto the frame 6, as indicated in FIG. 1, but cannot pass on over the frame because they rotate on the rollers 7, 8, 12. Meanwhile, the anti-skid means 5 on the underside of the frame 6 bites into the ground under the weight of the car, and the car is stopped. The relative displacement between the rear axle support member (and accordingly the branch member 3) and the frame 6 before the rear wheels 20 climb onto the frame 6 when it is dropped in the path of travel of the rear wheels 20 can be accommodated by the long slot 13 in the arms 14, 14', so the rear wheels 20 can climb onto the frame 6. The rollers 8, 12 are enlarged at both their ends to form tapered parts 8', 12', whose function is to prevent the wheel from slipping sidewise when the car stops on inclined ground. Experiments show that, rain or shine, a vehicle travelling at 50 km/h will stop after slipping 3 meters.

What is claimed is:

1. An emergency stopping device for a wheeled vehicle, comprising a frame and means mounting said frame for swinging movement between a position lying in the path of travel of one of the wheels of said vehicle and a position clear of said path, said frame being provided with a plurality of rollers on which said wheel is supported when it rides up on said frame, together with an anti-skid projection on its underside and stop means spaced from said rollers, and said device further comprising a roller mounted to swing at the end of a pair of arms pivotally attached to the middle of the frame, spring means biassing said roller carrying arms toward said stop means, and means for raising and lowering said frame.

* * * * *